(12) United States Patent
Scannapieco et al.

(10) Patent No.: US 11,859,272 B1
(45) Date of Patent: Jan. 2, 2024

(54) IN SITU ALLOYING OF CU—CR—NB ALLOYS USING SELECTIVE LASER MELTING

(71) Applicant: United States of America as represented by the Administrator of NASA, Washington, DC (US)

(72) Inventors: David S. Scannapieco, Cleveland, OH (US); David L. Ellis, Cleveland, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 17/235,395

(22) Filed: Apr. 20, 2021

Related U.S. Application Data

(60) Provisional application No. 63/012,666, filed on Apr. 20, 2020.

(51) Int. Cl.
*C22C 9/00* (2006.01)
*B22F 10/28* (2021.01)

(52) U.S. Cl.
CPC ............... *C22C 9/00* (2013.01); *B22F 10/28* (2021.01)

(58) Field of Classification Search
CPC .................................. C22C 9/00; B22F 10/28
See application file for complete search history.

(56) References Cited

U.S. PATENT DOCUMENTS

2022/0250153 A1* 8/2022 Li ..................... B33Y 40/10
2022/0281006 A1* 9/2022 Heikkinen .......... C22C 32/0047

OTHER PUBLICATIONS

Hayes, et al., "Characterization of Selective Laser Melted GRCop-84," AIAA Propulsion and Energy Forum, Jul. 9-11, 2018, pp. 1-57 (Year: 2018).*
Cooper et al., "Three-Dimensional Printing GRCop-42," NASA/TM-2018-220129, pp. 1-9 (Year: 2018).*
Onuike et al., "Additive manufacturing of Inconel 718-Copper alloy bimetallic structure using laser engineered net shaping (LENSTM)," Additive Manufacturing 21 (2018), pp. 133-140 (Year: 2018).*

* cited by examiner

*Primary Examiner* — John A Hevey
(74) *Attorney, Agent, or Firm* — Robert H. Earp, III; Mark Wolfgang; Trenton J. Roche

(57) ABSTRACT

In situ alloying of elemental Cu, Cr, and Nb powder using laser melting to form a Cu—$Cr_2$Nb alloy. The elemental powders are initially mixed to form a homogeneous mixture, which mixture is then subjected to laser radiation to melt the mixture. In the melt, the Cr and Nb react to form $Cr_2$Nb, which when cooled form precipitates that are dispersed in a nearly pure Cu matrix to thus dispersion strengthen the material. The methods can be used to additively manufacture a 3D component of Cu—$Cr_2$Nb alloy using a selective laser melting machine.

8 Claims, 3 Drawing Sheets

IN SITU ALLOYING OF CU—CR—NB ALLOYS USING SELECTIVE LASER MELTING

CROSS REFERENCE TO RELATED APPLICATION

This application claims priority to U.S. Provisional Patent Application Ser. no. 63/012,666 filed Apr. 20, 2020, which is expressly incorporated herein by reference.

ORIGIN OF THE INVENTION

The invention described herein was made by employees of the United States Government and may be manufactured and used by or for the Government for Government purposes without the payment of any royalties thereon or therefor.

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND

Copper-Chromium-Niobium (Cu—Cr—Nb or Cu—$Cr_2Nb$) alloys, which are known as Glenn Research Copper (GRCop), are a family of Powder Metallurgy (PM) alloys with up to 10 atomic percent Cr and 5 atomic percent Nb. The alloys are commercially produced as pre-alloyed powders, which can then be built up by powder metallurgy or additive manufacturing techniques to form a component having a desired shape.

GRCop alloys have good high temperature mechanical properties and high thermal conductivity. The GRCop alloy family has a nearly pure Cu matrix with dispersed $Cr_2Nb$ precipitates that provide dispersion strengthening to the alloy. The nearly pure matrix of Cu allows for high thermal conductivity while the precipitates contribute high temperature mechanical properties to make the alloy viable in combustion chambers.

Formation of GRCop alloys require high cooling rates during solidification because the formation of $Cr_2Nb$ occurs rapidly when below the liquidus temperature of the compound. GRCop alloys have therefore conventionally been made by gas atomization, which typically has cooling rates in the $10^4$ K/s range. This process creates pre-alloyed powders containing the $Cr_2Nb$ precipitates that are then consolidated via hot isostatic pressing (HIP), extrusion, laser powder bed fusion additive manufacturing (LBPF AM), etc. to form a desired component.

The conventional production process of these pre-alloyed powders involves melting the elemental metals of copper (Cu), chromium (Cr), and niobium (Nb) at temperatures exceeding 1750° C. to form a melt. The melt is then atomized into droplets by gas atomization, which causes the droplets to rapidly cool and form fine powder of the Cu—Cr—Nb alloy. This pre-alloyed powder is then subsequently used in a PM or AM technique to form a desired component of the GRCop alloy.

Problems with this pre-alloyed powder production process include impurities in the GRCop alloy resulting from a reaction occurring between the elemental metals or melt and the refractory containers in which they are contained, and impurities in the GRCop alloy powder resulting from a reaction between the elemental metals or melt and oxygen. Moreover, commercial procurement of such pre-alloyed powder has long lead times of up to 16 weeks or more due to manufacturing requirements. Moreover, current commercially available GRCop alloys are expensive, and are otherwise limited to alloys known as GRCop-84, which is 8 atomic % Cr, 4 atomic % Nb, and a remainder of Cu; GRCop-42, which is 4 atomic % Cr, 2 atomic % Nb, and a remainder of Cu; and GRCop-21, which is 2 atomic % Cr, 1 atomic % Nb, and a remainder of Cu.

SUMMARY

In one aspect, a method of making a dispersion strengthened Cu—$Cr_2Nb$ alloy includes preparing a mixture of powders, the powders including copper (Cu) powder, chromium (Cr) powder, and niobium (Nb) powder; melting at least a portion of the mixture using a laser; and cooling a melted portion of the mixture to form the dispersion strengthened Cu—$Cr_2Nb$ alloy.

In another aspect, a method of additively manufacturing a component includes the steps of preparing a mixture of powders, the powders including copper (Cu) powder, chromium (Cr) powder, and niobium (Nb) powder; forming a layer of the mixture; melting a portion of the layer using a laser; cooling a melted portion of the layer to form an initial fused portion of a Cu—$Cr_2Nb$ alloy; and repeating the forming step, the melting step, and the cooling step to form subsequent fused portions of the Cu—$Cr_2Nb$ alloy connected to each other and to the initial fused portion so as to form the component.

DETAILED DESCRIPTION

Figure 1:
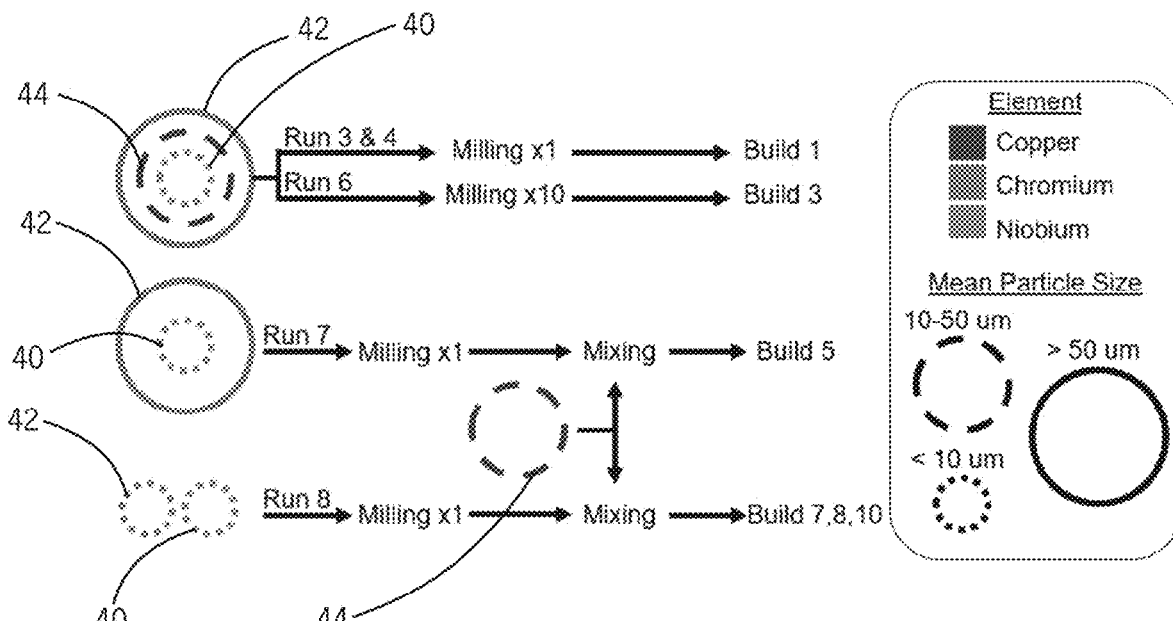
FIG. 1 is a schematic diagram of powder preparation according to the present subject matter.

GRCop alloys are increasingly being baselined for use in regeneratively cooled rocket engine main combustion chamber liners. Pre-alloyed GRCop powders are suitable for the preparation of GRCop alloy parts using additive manufacturing, such as laser powder bed fusion, selective laser melting, and the like. However, these pre-alloyed GRCop powders are expensive and their procurement requires long lead times.

The present subject matter thus provides methods of in situ alloying of elemental powders using selective laser melting in order to produce GRCop alloys. These alloying methods may be utilized to additively manufacture a component comprising GRCop alloys.

Discrete elemental powders of Cu, Cr, and Nb may be mixed and laser melted to produce a GRCop alloy, which forms a $Cr_2Nb$ intermetallic phase dispersed in a matrix of Cu as is characteristic of GRCop alloys. The $Cr_2Nb$ intermetallic phase forms during laser melting as a result of a reaction between the molten Cr and the molten Nb, while the Cu does not react and thus forms the Cu matrix.

The process allows the use of elemental Cu powder, elemental Cr powder, and elemental Nb powder, which are readily available, and thus their procurement is relatively inexpensive and has relatively short lead times. Further, the process may reduce or eliminate contamination/impurities in the alloy. This is because the alloy is formed within a bed of the mixture of elemental powders, and thus during formation, the alloy may only come into contact with itself or the elemental powders used for its formation, rather than coming into contact with oxygen or the refractory containers as in conventional GRCop formation techniques.

The $Cu—Cr_2Nb$ alloys can be produced in situ during the selective laser melting process from the blended elemental powders, rather than having to procure them as pre-alloyed powders from a commercial supplier. As such, the relative amounts of these elemental powders can be adjusted in the mixture in order to allow for the formation of alloys having various amounts of Cr and Nb relative to the amount of Cu. This allows for the on-demand production of GRCop alloys having chemical compositions that may not be commercially available.

The methods include providing elemental Cu, Cr, and Nb powders. The powders are not particularly limited and may be acquired from commercial vendors. The purity of the powders may or may not be restricted. If high purity powders are used, e.g. powders having a purity of 99% or more, this may inhibit the amount of impurities in the GRCop alloy.

Different size powders may be used. The nomenclature used to characterized the size of the powder (e.g. particle size or particle size distribution of the powder) may include various conventions such as mean particle size, average particle size, mode of the particle sizes; a mesh/sieve value: particle size distribution widths such as D50, D90, and/or D10 values; or combinations thereof. These sizes may be determined using various measurement techniques including dynamic light scattering, image analysis, laser diffraction, sieve analysis, air elutriation analysis, sedimentation techniques, laser obscuration time, acoustic spectroscopy, or combinations thereof.

In a non-limiting embodiment, the Cu powder may have a mean particle size of 10-50 μm largest diameter; the Cr powder may have a mean particle size of 30-100 μm largest diameter, or less than 10 μm largest diameter; and the Nb powder has a mean particle size of less than approximately 10 μm largest diameter.

The particle size of the powders may be adjusted from that of a commercially available powder. The adjustment of the size may be conducted by milling either before or during mixing of two or more of the powders. Such milling may be conducted using a ball mill, planetary mill, ball mill attritor, roller mill, rod mill, etc., or any other method. Other types of mills, grinders, commutators, or attritors may be used, either on an individual basis or combined in a sequence to reduce the size of the powders. The particle size adjustment may be used on two or more powders at once so as to also mix the two or more powders together while adjusting their sizes. If Cr and Nb powders are mixed and then milled together in the absence of the Cu powder, this may promote intimate contact between the Cr and Nb powders and thus increase the reaction between molten Cr and Nb to form $Cr_2Nb$.

The elemental powders may be milled and mixed in an inert atmosphere, such as an argon atmosphere, that is free or nearly free of oxygen (i.e. oxygen content below 0.1%). This may inhibit a reaction between oxygen and any of the elemental powders, such as would produce oxides of the elemental powders, and thus may inhibit the amount of impurities in the GRCop alloy.

The amount of powders may be adjusted in order to attain a desired chemical composition for the GRCop alloy, which generally follow a stoichiometric ratio of Cr:Nb of about 2:1 due to the formation of the intermetallic phase of $Cr_2Nb$. Thus, the Cr and Nb powders may be included in the mixture at this 2:1 ratio. In some embodiments, a slight excess of Cr may be added to improve hydrogen embrittlement resistance. For example, a 2.05-2.1:1 Cr:Nb ratio may be used to reduce hydrogen embrittlement exposure.

The total amount for each of the Cu, Cr, and Nb powders may be controlled so as to provide different GRCop alloys having different amounts/ratios of Cu, Cr, and Nb. In non-limiting embodiments, the produced GRCop alloy may include Cr at atomic percentages of 1-20, up to 10, 1-10, up to 8, 1-8, up to 4, 1-4, 4-10, or other percentages of the total amount of alloy; Nb at atomic percentages of 0.5-10, up to 5, 0.5-5, up to 4, 0.5-4, up to 2, 0.5-2, 2-5 or other atomic percentages of the total amount of alloy; and a remainder of the total alloy including Cu. The remainder may also include trace amounts of impurities or contaminants, e.g., under 1 atomic percent. The amount of alloying may be controlled by selecting predetermined amounts of each elemental powder. In non-limiting embodiments, a GRCop alloy includes up to 10 atomic percent of Cr, up to 5 atomic percent of Nb, and a remainder including Cu; up to 8 atomic percent of Cr, up to 4 atomic percent of Nb, and a remainder including Cu; or up to 4 atomic percent of Cr, up to 2 atomic percent of Nb, and a remainder including Cu.

The elemental powders are combined to form a mixture. Such combination may include physically mixing the elemental powders, such as by rolling, so as to produce a homogeneous or nearly homogeneous mixture of elemental powders. Various mixing techniques can be used to mix the powders, such as manual mixing or mechanical mixing. The mixing can further include a reduction of the particle size of the powders being mixed. The mixing can include rolling (which may not significantly reduce the size of the powders being mixed) or grinding (which may reduce the size of the powders). The mixing can be accomplished by the use of a planetary mill, ball mill attritor, blender, or any other mechanism or method that physically mixes the powders.

The elemental powders may be mixed by adding the powders together in various orders. In non-limiting embodiments, all three elemental powders of Cu, Cr, and Nb are added together at the same time and then mixed to form the mixture. In other non-limiting embodiments, the Cr and Nb powders are added together and mixed (optionally with a concurrent or subsequent reduction in the size of the powders), and only later are these two powders then mixed with the Cu powder. This process may promote a more-intimate contact between the Cr and Nb powders than would otherwise occur if they were concurrently mixed with the Cu powder, and this may increase the level of reaction between Cr and Nb to form the $Cr_2Nb$ precipitates in the GRCop alloy.

Once the elemental powders are combined to form the mixture, a laser is used to melt the mixture, or a portion thereof. Melting the mixture allows for the in situ formation of a $Cu—Cr_2Nb$ alloy, where in the transitory melted phase, the melted Cu acts as a solvent in which the Cr and Nb can migrate and chemically react with each other to form the $Cr_2Nb$ phase, while the Cu remains unreacted. Upon cooling and solidification, the Cu forms a continuous, almost pure Cu matrix in which the discontinuous $Cr_2Nb$ phase is dispersed.

The GRCop alloy produced by the methods disclosed herein may have an average size for the $Cr_2Nb$ phase of 0.1-1 μm, and may have the same or similar microstructure as commercially available pre-alloyed GRCop alloys conventionally produced by gas atomization.

Figure 2:
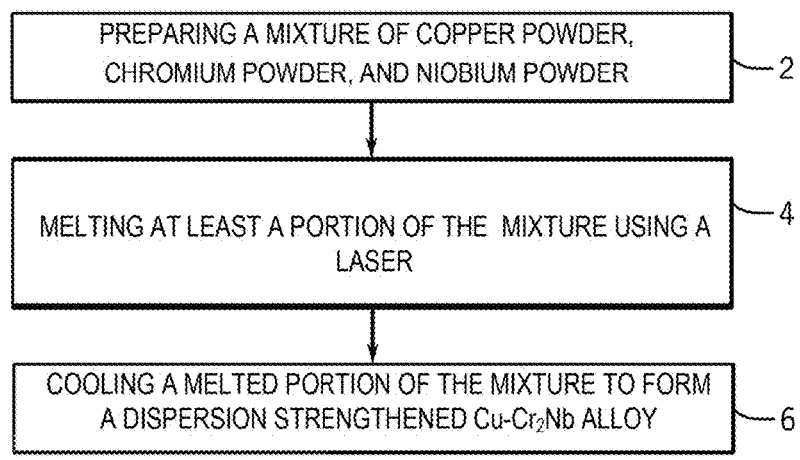
FIG. 2 is a schematic block diagram illustrating a method according to the present subject matter.

With reference to FIG. 2, a method of making a dispersion strengthened Cu—$Cr_2Nb$ alloy is provided, in which alloy includes the continuous Cu phase strengthened by the dispersed $Cr_2Nb$ phase. The method includes, at 2, preparing a mixture of elemental powders, the powders including copper (Cu) powder, chromium (Cr) powder, and niobium (Nb) powder. The method includes, at 4, melting at least a portion of the mixture using a laser. At 6, the melted portion of the mixture is then cooled to form the dispersion strengthened Cu—$Cr_2Nb$ alloy.

Figure 3:
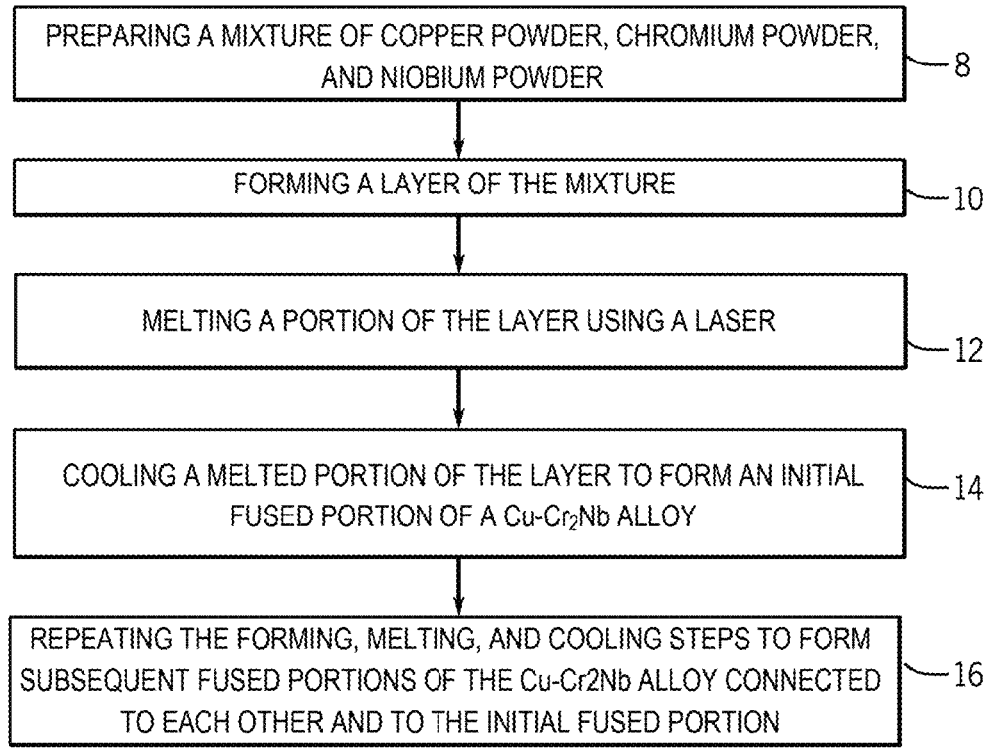
FIG. 3 is a schematic block diagram illustrating another method according to the present subject matter.

With reference to FIG. 3, a method allows for a three-dimensional (3D) component of the Cu—$Cr_2Nb$ alloy to be formed from the mixture of elemental powders by additive manufacturing. The method includes, at 8, preparing a mixture of elemental powders, the powders including copper (Cu) powder, chromium (Cr) powder, and niobium (Nb) powder. At 10, a layer of the mixture is formed, and at 12, a portion of the layer is melted using a laser. The melted portion of the layer is then cooled at 14, to form an initial fused portion of Cu—$Cr_2Nb$ alloy. At 16, these steps are then repeated to form subsequent fused portions of the Cu—$Cr_2Nb$ alloy, which are connected to each other and to the initial fused portion so as to form the 3D component.

The mixture of elemental powders may be melted as part of a selective laser melting (SLM) process using a SLM machine, direct energy deposition machine, blown powder, etc. The melting and subsequent cooling of the mixture can also be utilized to additively manufacture the 3D component of GRCop alloy. Any suitable process for selective melting may be used to melt the mixture of elemental powders.

Figure 4:
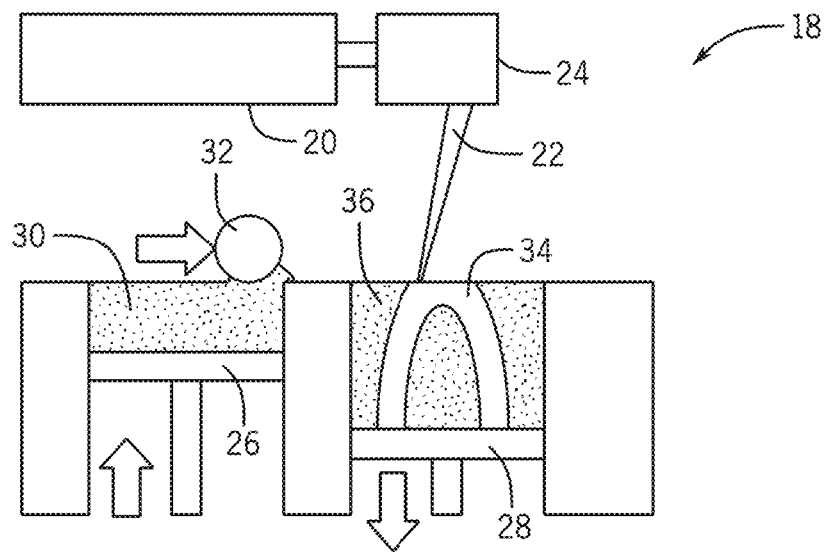
FIG. 4 is a schematic side cross-sectional view of a laser melting machine that is suitable for use in methods according to the present subject matter.

With reference to FIG. 4, the methods described herein may be performed, for example, using a SLM machine 18, which can include a laser 20 for emitting laser radiation 22 and a scanner system 24 for directing the laser radiation 22. The machine 18 may include a powder delivery platform 26 and a build platform 28. The mixture 30 of elemental powders may be arranged on the powder delivery platform 26, which may move up to present some of the mixture 30 to a roller or arm 32, which moves the mixture 30 from the delivery platform 26 to the build platform 28 as depicted on the left side of FIG. 4. This movement of the mixture by the arm 32 may include the arm 32 spreading and leveling the mixture to make a uniformly thick powder layer of the mixture on the build platform 28 as a powder bed 36.

The right side of FIG. 4 depicts the successive additive manufacturing of a three-dimensional component. The laser 20 and scanner system 24 is then operated to direct the laser radiation 22 onto the powder layer of the mixture to selectively melt a selected portion of the powder layer of the mixture 30, which cools to form a fused portion on the build platform 28. The powder delivery system may then spread and level more of the mixture as the next powder layer. These steps may be repeated to successively build a plurality of fused portions, each of which fuse by laser energy to the previously formed fused portion to form a 3D component 34. The 3D component 34, formed by the layer-by-layer buildup of the plurality of fused portions in this additive manufacturing process, may be surrounded by the powder bed 36 containing the mixture, which has not been melted by the laser. Thereafter, the 3D green component 34 may be removed from the powder bed 36 and subject to a further processing as desired. The 3D component 34 may be 3D printed in this manner by following a predetermined model of the 3D component 34 stored in a computer aided design (CAD) file which is used to control the scanner system 24 to direct the laser radiation 22 upon each layer of the powder mixture.

The methods of forming the 3D green component or the 3D composite component may be practiced using machines other than those described herein, including a laser sintering machine that does not include the powder delivery platform 26 and the arm or roller 32 for spreading the layers of the mixture 30 on the build platform 28. Other suitable machines may include other delivery systems for forming the mixture 30 to the build platform 28, including, for example, a gravity fed delivery system or blown powder processes such as Directed Energy Deposition.

The melting step may be performed using the SLM machine 18, such as an EOS M100 available from EOS GmbH of Germany. As part of the SLM process, the mixture 30 of elemental powders is spread onto the build platform 28 so as to form a powder layer, which may have a thickness of 100-150 μm for example. Other powder layer thicknesses can be used. The laser beam 22 from the laser 20 is selectively irradiated on a predetermined area of the powder layer (i.e. on a selected cross-sectional area) to melt the metal powders of the mixture in the predetermined area of the powder layer, which when cooled forms an initial fused portion of the powder layer in the powder bed 36. The molten material rapidly solidifies once the laser beam 22 passes. Cooling of the molten material may occur at a rate similar to the chill block melt spinning process, such as at a cooling rate of 104 K/s to 106 K/s. This quick cooling of the material produces very fine $Cr_2Nb$ precipitates of the size of 0.1-1 μm, which are dispersed in a near pure Cu matrix.

The laser 20 in the SLM machine 18 may be $CO_2$ laser, which may be operated at a power of 25-38 watts for example. In other embodiments, a Yb-fiber laser operating at 200 W may be used to melt the mixture. Other types of lasers and power ratings can be used.

The build platform 28 then moves down by one-layer thickness (e.g. 10-50 μm for an SLM process), and a new powder layer of the mixture is delivered on top of the previously lasered powder layer and newly built initial fused portion. This process of spreading the mixture into a powder layer, and then selectively irradiating the powder layer, are successively repeated to create subsequent fused portions in each successive powder layer, which are built up on top of a prior fused portion, where each successive fused portion fuses with the previously-formed fused portion to form a 3D component 34 in the powder bed 36.

In this process, the presently-formed fused portion may fuse with the previously-formed fused portion, and so on, during the laser melting of the presently-formed fused portion. This may result in the layer-by-layer buildup of the 3D component 34. Such layer-by-layer process of building the 3D component 34 may operate automatically by computer control of the scanner system 24 of the SLM machine 18, such as where the selected area of the powder layer to be irradiated by the laser beam 22 is defined by a model of the 3D component from a CAD file.

Upon completion of this process, the un-melted mixture in the powder bed 36 and the 3D component 34 are removed from the build platform 28, with the un-melted mixture being able to be used again in a subsequent SLM process to build up a different 3D component.

In the SLM process of printing the 3D component 34, the powder bed temperature may be ambient (e.g. 18-25° C.). In another embodiment, the powder bed may be heated to a temperature suitable for a particular material, process, or product. A feed temperature of the mixture may be ambient, or may be heated.

EXAMPLES

The following examples were prepared, and are not meant to limit the present subject matter.

Elemental powders were acquired from American Elements of Los Angeles, California. The copper powder was 10 μm to 50 μm in diameter, which is typical for SLM processing. The niobium powder came in two lots, both of which were under 10 μm in diameter. The chromium powder also came in two lots. The first lot of Cr powder had a diameter range of 30-100 μm, with a mean particle diameter greater than 50 μm, and the second lot was finer than 10 μm.

Powders for SLM were prepared by a combination of high energy ball milling and rolling to achieve uniform spatial distributions of Cr and Nb powders in the Cu powder.

Eleven specimens representing the outer boundary of all parameter sets used were analyzed. The specimens and their normalized milling and laser melting parameters are summarized in Table 1.

TABLE 1

| Specimen | Powder Run | Build | Laser Power | Laser Scan Speed | Cr + Nb Milled together | Milling Time |
|---|---|---|---|---|---|---|
| 1 | 3&4 | 1 | 0.50 | 1.00 | No | 1 τ |
| 2 | 3&4 | 1 | 0.75 | 0.75 | No | 1 τ |
| 3 | 6 | 3 | 1.54 | 0.39 | No | 10 τ |
| 4 | 7 | 5 | 1.10 | 0.56 | Yes | 1 τ |
| 5 | 7 | 5 | 1.10 | 0.25 | Yes | 1 τ |
| 6 | 7 | 5 | 0.44 | 0.08 | Yes | 1 τ |
| 7 | 8 | 7 | 1.21 | 1.00 | Yes | 1 τ |
| 8 | 8 | 8 | 1.25 | 1.25 | Yes | 1 τ |
| 9 | 8 | 10 | 1.87 | 0.44 | Yes | 1 τ |
| 10 | 8 | 10 | 1.37 | 0.67 | Yes | 1 τ |
| 11 | 8 | 10 | 1.87 | 0.67 | Yes | 1 τ |

A schematic of the preparation process for each specimen is shown in FIG. 1. All milling of the elemental powders was conducted with 6.6 mm stainless steel balls in stainless steel chambers backfilled with high purity Argon gas. Powders in specimens 1-3 included the Cu powder 44, the first lot of Cr powder 42 (30-100 μm), and the first lot of Nb powder 40 (<10 μm), which were all milled together on a 4-position planetary mill. Powders in specimens 4-6 included the first lot of Cr powder 42 (30-100 μm), and the first lot of Nb powder 40 (<10 μm), which were milled together and then subsequently added to Cu powder 44 via rolling. The milling of Cr powder 42 and Nb powder 40 was done on a single position planetary mill with 6.6 mm stainless steel balls in a stainless-steel chamber. Powders in specimens 7-11 included the second lot of Cr powder 42 (<10 μm) and the second lot of Nb powder 40 (<10 μm), which were milled together and then subsequently added to Cu powder 44 via rolling.

Once prepared, the powders were consolidated into 1 cm³ cubes using an EOS M100 additive manufacturing printer utilizing a wide array of laser powers and scan speeds as shown above in Table 1. A phase extraction of the precipitates was performed in order to determine the amount of $Cr_2Nb$ precipitates in the cubes. This was done by dissolving portions of the cubes in nitric acid, which left a residue of $Cr_2Nb$ precipitates and the residue was collected and weighed.

A comparative example of a consolidated GRCop alloy that was made from conventional gas atomized pre-alloyed GRCop powders was analyzed in the same way to determine the amount of $Cr_2Nb$ precipitates. The extracted precipitates were distributed onto individual single crystal silicon wafers (low background holder) for XRD analysis, and examined in a Hitachi S4700 Scanning Electron Microscope (SEM) for morphological comparison between them.

Table 2 shows the detected phases by XRD (in weight percent), for each of the specimens 1-11, the comparative example (CompEx), and the milled Cr and Nb (Cr+Nb) powders of Run 8 that were used in Builds 7, 8, and 10 for Specimens 7-11, which Cr and Nb powders represent the starting elemental powders.

TABLE 2

| Specimen | $Cr_2Nb$ | Cr | Nb | $NbO_{0.8}$ | NbO | $NbO_2$ | Cu |
|---|---|---|---|---|---|---|---|
| Cr + Nb | 0.0% | 53.8% | 46.2% | 0.0% | 0.0% | 0.0% | 0.0% |
| 1 | 14.7% | 3.3% | 58.7% | 2.0% | 2.4% | 5.1% | 13.8% |
| 2 | 20.3% | 3.5% | 58.4% | 0.0% | 5.6% | 12.1% | 0.0% |
| 3 | 15.6% | 1.0% | 55.1% | 0.0% | 16.3% | 12.1% | 0.0% |
| 4 | 53.7% | 12.0% | 25.0% | 3.3% | 3.6% | 2.3% | 0.0% |
| 5 | 71.3% | 6.1% | 7.4% | 2.7% | 8.6% | 3.8% | 0.0% |
| 6 | 38.5% | 24.3% | 18.0% | 3.5% | 1.4% | 3.5% | 10.8% |
| 7 | 70.3% | 8.6% | 12.3% | 0.0% | 5.9% | 2.9% | 0.0% |
| 8 | 64.7% | 11.8% | 15.7% | 0.0% | 5.2% | 2.6% | 0.0% |
| 9 | 67.1% | 5.6% | 3.1% | 0.0% | 18.0% | 6.2% | 0.0% |
| 10 | 75.4% | 6.8% | 7.6% | 0.0% | 6.8% | 3.4% | 0.0% |
| 11 | 63.2% | 6.6% | 10.5% | 0.0% | 15.7% | 3.9% | 0.0% |
| CompEx | *97.0% | 0.0% | 0.0% | 0.0% | 0.0% | 3.0% | 0.0% |

Note that the Comparative Example has 97 wt % $Cr_2Nb$, which is actually 88.2 wt % of the hexagonal, high-temperature $Cr_2Nb$ phase and 8.8 wt % of the cubic, room-temperature $Cr_2Nb$ phase.

Table 3 shows the atomic percentages of each element present in the precipitates based upon the XRD phase results, and confirms a deficiency of Cr in Specimens 1-3. This Cr deficiency is the largest contributor to the low conversion rates for $Cr_2Nb$ in Specimens 1-3.

TABLE 3

| Specimen | Nb | Cr | O | Cu | Nb in Cr2Nb | Cr in Cr2Nb |
|---|---|---|---|---|---|---|
| Cr + Nb | 33.3% | 66.6% | 0.0% | 0.0% | — | — |
| 1 | 58.8% | 15.9% | 8.9% | 16.5% | 9.5% | 70.2% |
| 2 | 62.9% | 19.6% | 17.5% | 0.0% | 58.9% | 60.3% |
| 3 | 63.8% | 12.3% | 23.8% | 0.0% | 8.6% | 89.2% |
| 4 | 41.8% | 51.9% | 6.3% | 0.0% | 43.7% | 70.3% |
| 5 | 36.5% | 53.3% | 10.2% | 0.0% | 62.8% | 86.1% |
| 6 | 29.1% | 54.0% | 6.0% | 10.9% | 42.2% | 45.6% |
| 7 | 36.6% | 56.9% | 6.5% | 0.0% | 63.0% | 81.2% |
| 8 | 36.8% | 57.4% | 5.8% | 0.0% | 58.0% | 74.3% |
| 9 | 35.9% | 48.0% | 16.1% | 0.0% | 57.9% | 86.4% |
| 10 | 35.4% | 57.2% | 7.5% | 0.0% | 69.1% | 85.4% |
| 11 | 38.4% | 48.5% | 13.0% | 0.0% | 52.7% | 83.5% |
| CompEx | 33.9% | 64.3% | 1.8% | 0.0% | — | — |

The Cr powder used in Specimens 1-3 were in excess of 50 μm. The maximum usable powder diameter for the EOS M100 is about 60 μm. It is suspected that a significant proportion of the Cr was removed due to this upper powder size limit.

In Specimens 4-6 however, the same size Cr and Nb powders were used as in Specimens 1-3, but the Cr and Nb powders were first milled without Cu to reduce their size and improve physical contact between Cr and Nb in order to promote $Cr_2Nb$ formation. These Specimens 4-6 did have a higher proportion of $Cr_2Nb$ compared to all Specimens 1-3. The formation of $C_2Nb$ during laser melting is diffusion based and restricted to occurring only when the metals are a melt. Therefore, by milling only Cr and Nb together, the surface area contact between the two powders is increased. With increased contact area, more of the reaction between Cr and Nb is able to carry further to form the $Cr_2Nb$ precipitates without a significant increase in the time that CR and Nb spend in the melt as necessitated for them to react. The result Specimens 4-6 having higher $Cr_2Nb$ content demonstrates that the reaction behaves as expected even under chaotic additive manufacturing conditions.

To improve the alloying further, Specimens 7-11 used smaller Cr and Nb powders to further increase contact area between Cr and Nb. With this powder preparation, an improvement in the consistency and success of the alloying process was obtained. The weight percent of converted $Cr_2Nb$ ranged from 63 wt. % to 75 wt. % for Specimens 7-11, all of which used the same starting powders. This demonstrated more consistent alloying success as a result of the powder preparation, in contrast to Specimens 4-6, which generated $Cr_2Nb$ in the range from 38 wt. % to 71 wt. %. Furthermore, the Nb proportion in the $Cr_2Nb$ precipitates were consistent within each of the Specimens 7-11, while in Specimens 4-6 the Nb content was not as consistent and had a wider range from 29 at. % to 41 at. %. The Cr in Specimens 7-11 also only varied by 11 at. % as seen in Table 3.

To analyze the impact of laser parameters on alloying, the results were normalized to the first specimen prepared, which first specimen is not reported here. This first specimen was chosen to be the standard because it was the first parameter block consolidated by laser melting, and there was a need to normalize parameters consistently within an ever-expanding data set.

The laser parameter results on alloying were normalized by taking the amount of Cr and Nb in the $Cr_2Nb$ phase as a proportion of the total Cr and Nb found in each specimen. These values are shown in the last two columns of Table 3. This comparison method allowed for quantifying the effect the laser parameters had on promoting alloying, while taking into account the impact of Cr deficiencies found in earlier specimens.

Laser power comparisons show that there was a clear difference in specimens below and above a normalized power of 1.1. A normalized laser power above 1.1 appeared to have higher alloying efficiency with higher consistency as well. The alloying efficiency vs. normalized laser power appeared to asymptotically approach about 90% Cr in the $Cr_2Nb$ phase. This suggests that continuing to increase laser power is not an efficient method, by itself, to improve $Cr_2Nb$ formation.

For all specimens, where the normalized laser power was varied, the results appeared to show no correlation between laser scan speed and the proportion of Cr in $Cr_2Nb$. However, for the normalized laser powers greater than 1.1, slower laser scan speeds improved $Cr_2Nb$ conversion. This matches expectations, since increasing the dwell time provides more time for the Cr and Nb to react to form $Cr_2Nb$. While this correlation appears to be linear, the improvement of $Cr_2Nb$ conversion based on slower laser scan speeds is quite small, indicating little influence of scan speed on $Cr_2Nb$ conversion. This implies that changing the laser scan speed is unlikely to greatly influence the alloying efficiency of $Cu-Cr_2Nb$ alloys.

Specimen 10, Specimen 11, and the Comparative Example were analyzed using SEM to investigate differences in $Cr_2Nb$ particle morphology caused by varying the build parameters. Specimens 10 and 11 were selected because they were amongst the higher and lower oxygen content specimens, respectively. In addition, by choosing two specimens in the same build, powder preparation variables are eliminated and the chemical influences on precipitates are isolated better. The Comparative Example was laser melted with conventional pre-alloyed gas atomized powder, and showed the typical Cr:Nb atomic ratio of 2 (Table 3). The Comparative Example also exhibited the lowest oxygen content, likely because most of the Cr and Nb was already alloyed to $Cr_2Nb$ prior to printing or extraction, which are the two suspected steps responsible for oxide formation.

Figure 5:
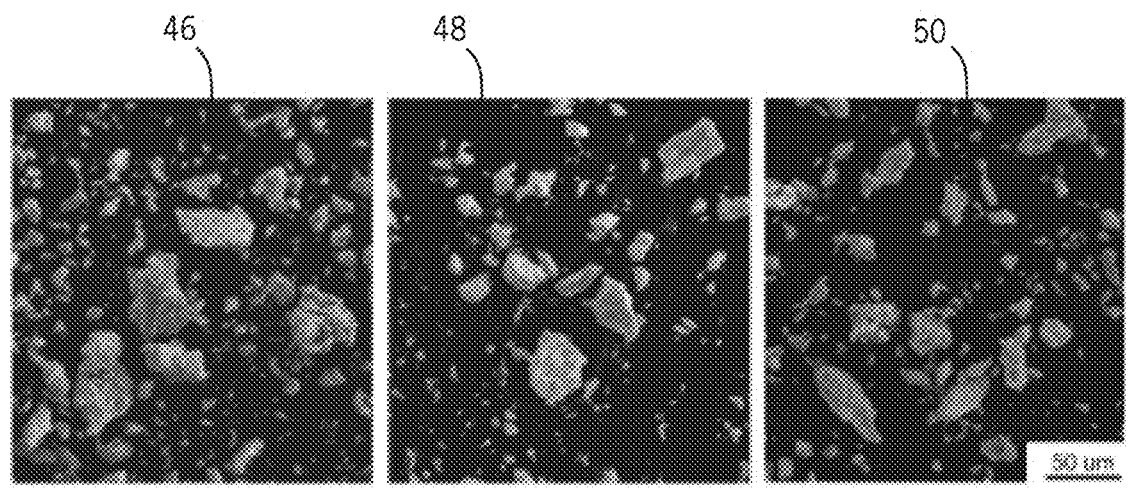
FIG. 5 are SEM micrographs of extracted precipitates for two inventive specimens and one comparative example.

FIG. 5 are SEMs showing the extracted precipitates for the three specimens. Specimen 10 (indicated with reference number 46), Specimen 11 (indicated with reference number 48), and the Comparative Example (indicated with reference number 48) exhibited morphologies as shown, which were essentially indistinguishable from each other. Elemental x-ray maps, produced using EDS, were used to determine if the extracted particles were multiphase based upon gross chemical differences. EDS x-ray maps indicated little to no elemental segregation at a resolution of about 1 μm. This suggests that each precipitate contains multiple, if not necessarily all, of the phases discussed.

Figure 6:
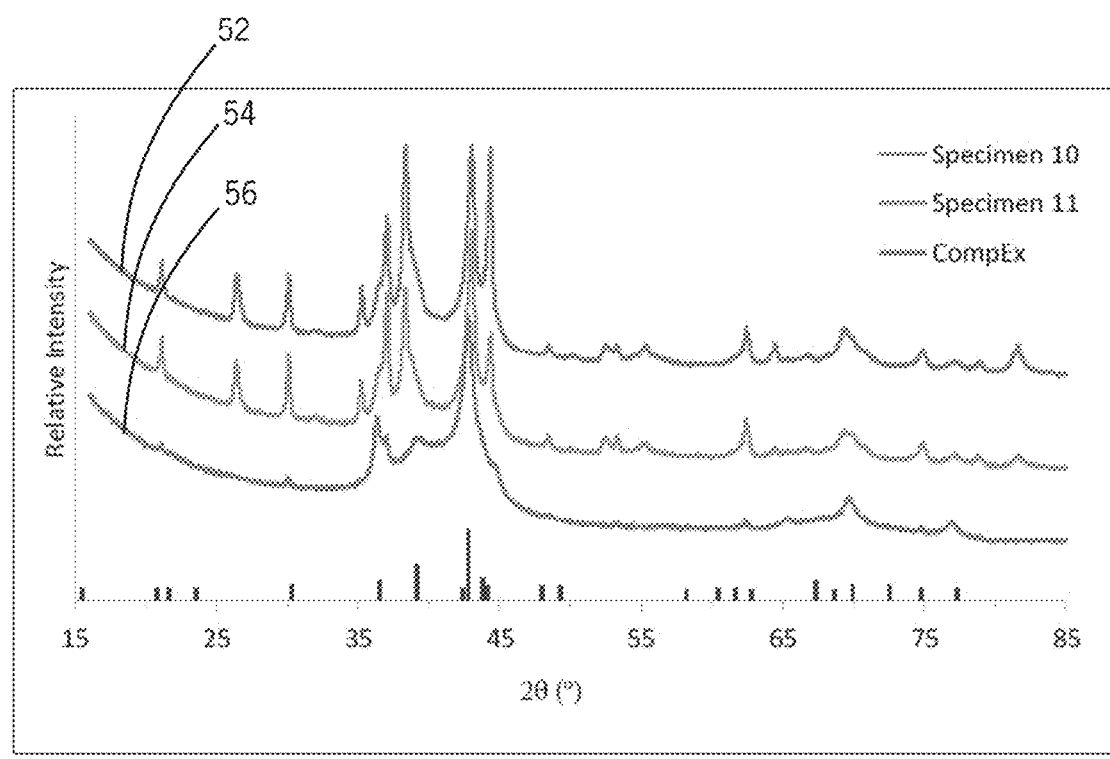
FIG. 6 is an X-ray powder diffraction (XRD) graph of two inventive specimens and one comparative example.

Although no obvious differences were seen in the SEM/EDS analysis of the particles, clear differences are identified in the XRD work. As shown in FIG. 6, all three specimens (Specimen 10 indicated with reference number 52; Specimen 11 indicated with reference number 54, and the Comparative Example indicated with reference number 56) show prominent peaks at around 38°. A secondary peak around 39° is seen only in Specimens 10 and 11. A cliff-like feature is seen in the Comparative Example at the same location, but that is likely an artifact of the detector manifold. There are several minor peaks associated with elemental phases that exist in Samples 10 and 11 that are not present in the Comparative Example.

It was noted previously that the precipitates in the Comparative Example contained both the room and high temperature phases of $Cr_2Nb$. While this feature is not present in Specimens 10 and 11, it may not be particularly significant since there is a tendency to hot isostatic press and heat treat these alloys after additive manufacturing, thus effectively resetting present phases to equilibrium.

In conclusion, the effects of powder preparation and laser parameters on the conversion of elemental powders to $Cr_2Nb$ showed that the primary variables controlling conversion were powder preparation and laser power. It is shown that the use of laser melting to form in situ alloy dispersion strengthened alloys, such as GRCop, is possible and can be done with a variety of printing parameters. Conversion efficiencies as high as 89% of potential converted material were achieved in these results. Further, the results showed that increasing the surface area contact through milling and reducing the particle size of Cr and Nb was effective at improving the $Cr_2Nb$ conversion. Normalized laser powers greater than 1.1 produced higher $Cr_2Nb$ conversion, although alloying efficiency appeared to asymptotically approach about 90% Cr in the $Cr_2Nb$ phase as normalized power increased to 1.865. Laser scan speed influence on $Cr_2Nb$ conversion was negligible for a normalized laser power above 1.1. Observed precipitate morphologies were similar regardless of oxygen content and consistent with GRCop-42 made from conventional gas atomized powders. Little to no elemental segregation in the precipitates was observed in the Specimens 10 and 11, similar to the Comparative Example.

The present subject matter provides a microstructure and composition for the GRCop alloy produced by the disclosed in situ methods that are similar to commercially produced pre-alloyed GRCop powders that are consolidated by conventional powder metallurgy production techniques, and is similar to component made by SLM processing of pre-alloyed GRCop-42 and GRCop-84 alloys.

However, the present invention does not require the various steps typically used to form a GRCop component, which include pre-alloying the metals to form the pre-alloyed GRCop powders, and the separate step of SLM to consolidate the pre-alloyed powders. Instead, the present methods require only SLM of elemental powders for the in-situ formation of a GRCop component. The invention thus allows for the on-demand formation of a complex alloy with the desired microstructure and phases using only the SLM process. The invention can thus reduce costs and lead times associate with the conventional formation of GRCop alloys, while allowing for the on-demand creation of GRCop alloys with tailorable properties.

It will be appreciated that various of the above-disclosed, and other features and functions, or alternatives or varieties thereof, may be desirably combined into many other different systems or applications. Also, it will be appreciated that various presently unforeseen or unanticipated alternatives, modifications, variations or improvements therein may be subsequently made by those skilled in the art which are also intended to be encompassed by the following claims.

The invention claimed is:

1. A method of making a dispersion strengthened $Cu$—$Cr_2Nb$ alloy, the method comprising:

preparing a mixture of powders, the powders including copper (Cu) powder, chromium (Cr) powder, and niobium (Nb) powder, wherein the Cu powder has a mean particle size of 10-50 μm, the Cr powder has a mean particle size of less than 10 82 m; and the Nb powder has a mean particle size of less than 10 μm, wherein the Cr powder and the Nb powder are combined together and milled prior to forming the mixture with the Cu powder;

melting at least a portion of the mixture using a laser; and cooling a melted portion of the mixture to form the dispersion strengthened $Cu$—$Cr_2Nb$ alloy.

2. The method of claim 1, wherein the dispersion strengthened $Cu$—$Cr_2Nb$ alloy includes a discontinuous $Cr_2Nb$ phase dispersed in a continuous Cu phase.

3. The method of claim 2, wherein the dispersion strengthened $Cu$—$Cr_2Nb$ alloy comprises:

up to 10 atomic percent of Cr;
    up to 5 atomic percent of Nb; and
    a remainder including Cu.

4. The method of claim 2, wherein the dispersion strengthened $Cu$—$Cr_2Nb$ alloy comprises:

up to 8 atomic percent of Cr;
    up to 4 atomic percent of Nb; and
    a remainder including Cu.

5. The method of claim 2, wherein the dispersion strengthened $Cu$—$Cr_2Nb$ alloy comprises:

up to 4 atomic percent of Cr;
    up to 2 atomic percent of Nb; and
    a remainder including Cu.

6. The method of claim 1, wherein the laser is used to selectively melt the portion of the mixture corresponding to a predetermined area.

7. The method of claim 6, wherein a selective laser melting machine is used to melt the portion from a powder layer in a powder bed of the mixture.

8. The method of claim 1, wherein during the cooling, the melted portion is cooled at a rate of 104 K/s to 106 K/s.

* * * * *